(12) United States Patent
Andersson et al.

(10) Patent No.: US 10,827,361 B2
(45) Date of Patent: Nov. 3, 2020

(54) METHOD IN A RADIO COMMUNICATION NETWORK

(71) Applicant: BI Nordic AB, Skellefteå (SE)

(72) Inventors: Lina Andersson, Skellefteå (SE);
Micke Eriksson, Ursviken (SE);
Anders Hedlund, Skellefteå (SE); Alf Sahlman, Skellefteå (SE); Rickard Segerstedt, Ursviken (SE)

(73) Assignee: BI NORDIC AB, Skelleftea (SE)

( * ) Notice: Subject to any disclaimer, the term of this patent is extended or adjusted under 35 U.S.C. 154(b) by 24 days.

(21) Appl. No.: 16/260,352

(22) Filed: Jan. 29, 2019

(65) Prior Publication Data

US 2020/0008078 A1 Jan. 2, 2020

(30) Foreign Application Priority Data

Jul. 2, 2018 (SE) .................................... 1850834

(51) Int. Cl.
*H04W 16/18* (2009.01)
*H04B 7/0413* (2017.01)
(Continued)

(52) U.S. Cl.
CPC .......... *H04W 16/18* (2013.01); *H04B 7/0413* (2013.01); *H04W 24/08* (2013.01); *H04W 24/10* (2013.01)

(58) Field of Classification Search
CPC ..... H04W 16/18; H04W 16/24; H04W 24/00; H04W 24/02; H04W 24/04; H04W 24/08;
(Continued)

(56) References Cited

U.S. PATENT DOCUMENTS

| 7,561,876 B2 * | 7/2009 | Chiou | H04Q 3/0083 455/418 |
| 7,941,136 B2 * | 5/2011 | Reed | H04L 41/0816 455/423 |

(Continued)

FOREIGN PATENT DOCUMENTS

| CN | 101345973 A | 1/2009 |
| EP | 2663120 A2 | 11/2013 |
| WO | 2011131175 A1 | 10/2011 |

OTHER PUBLICATIONS

International Search Report/Written Opinion dated Sep. 13, 2019 issued in corresponding/related International Application No. PCT/EP2019/067448.

(Continued)

*Primary Examiner* — Tri H Phan
(74) *Attorney, Agent, or Firm* — Patent Portfolio Builders PLLC

(57) ABSTRACT

The present invention relates to a method for monitoring network performance in a wireless communication network comprising multiple cells that communicate with wireless devices. Each cell provides coverage in a geographical area and the wireless communication network has a cell coverage plan with a calculated performance. The method comprising: a) retrieving geospatially located measurements from wireless devices; b) connecting each geospatially located measurement to a cell; c) arranging measurements into at least one cluster per cell; d) identifying deviations from the cell coverage plan; and e) initiating actions to reduce deviations.

18 Claims, 13 Drawing Sheets

(51) Int. Cl.
*H04W 24/08* (2009.01)
*H04W 24/10* (2009.01)

(58) Field of Classification Search
CPC .... H04W 24/10; H04W 64/00; H04B 7/0413; H04B 10/0773; H04B 10/0775; H04B 10/0795; H04B 17/00; G01S 5/0027; G01S 5/02527; G01S 2205/007
See application file for complete search history.

(56) References Cited

U.S. PATENT DOCUMENTS

| | | | | |
|---|---|---|---|---|
| 8,416,710 | B2* | 4/2013 | Brisebois | H04W 24/00 |
| | | | | 370/254 |
| 8,811,977 | B2* | 8/2014 | Austin | H04L 41/145 |
| | | | | 455/423 |
| 8,983,470 | B1* | 3/2015 | Ryan | H04W 24/02 |
| | | | | 455/436 |
| 9,332,458 | B2* | 5/2016 | Nuss | H04W 16/18 |
| 9,456,362 | B2* | 9/2016 | Flanagan | H04L 41/0823 |
| 9,730,135 | B1 | 8/2017 | Rahman | |
| 9,883,049 | B1* | 1/2018 | Warner | H04W 4/24 |
| 2010/0062790 | A1 | 3/2010 | Wigren | |
| 2011/0275364 | A1* | 11/2011 | Austin | H04L 41/12 |
| | | | | 455/423 |
| 2013/0225156 | A1 | 8/2013 | Yuan et al. | |
| 2013/0225189 | A1 | 8/2013 | Moon et al. | |
| 2013/0273921 | A1* | 10/2013 | Kenington | H04W 16/18 |
| | | | | 455/446 |
| 2014/0355484 | A1 | 12/2014 | Foster et al. | |
| 2015/0302123 | A1 | 10/2015 | Gloss et al. | |
| 2017/0013475 | A1 | 1/2017 | Lioliou et al. | |
| 2017/0150365 | A1 | 5/2017 | Goswami et al. | |
| 2017/0353991 | A1* | 12/2017 | Tapia | G06Q 10/20 |
| 2018/0160327 | A1 | 6/2018 | Garcia et al. | |

OTHER PUBLICATIONS

First Office Action and Search Report in Swedish Application No. 1850834-1 dated Mar. 1, 2019.

\* cited by examiner

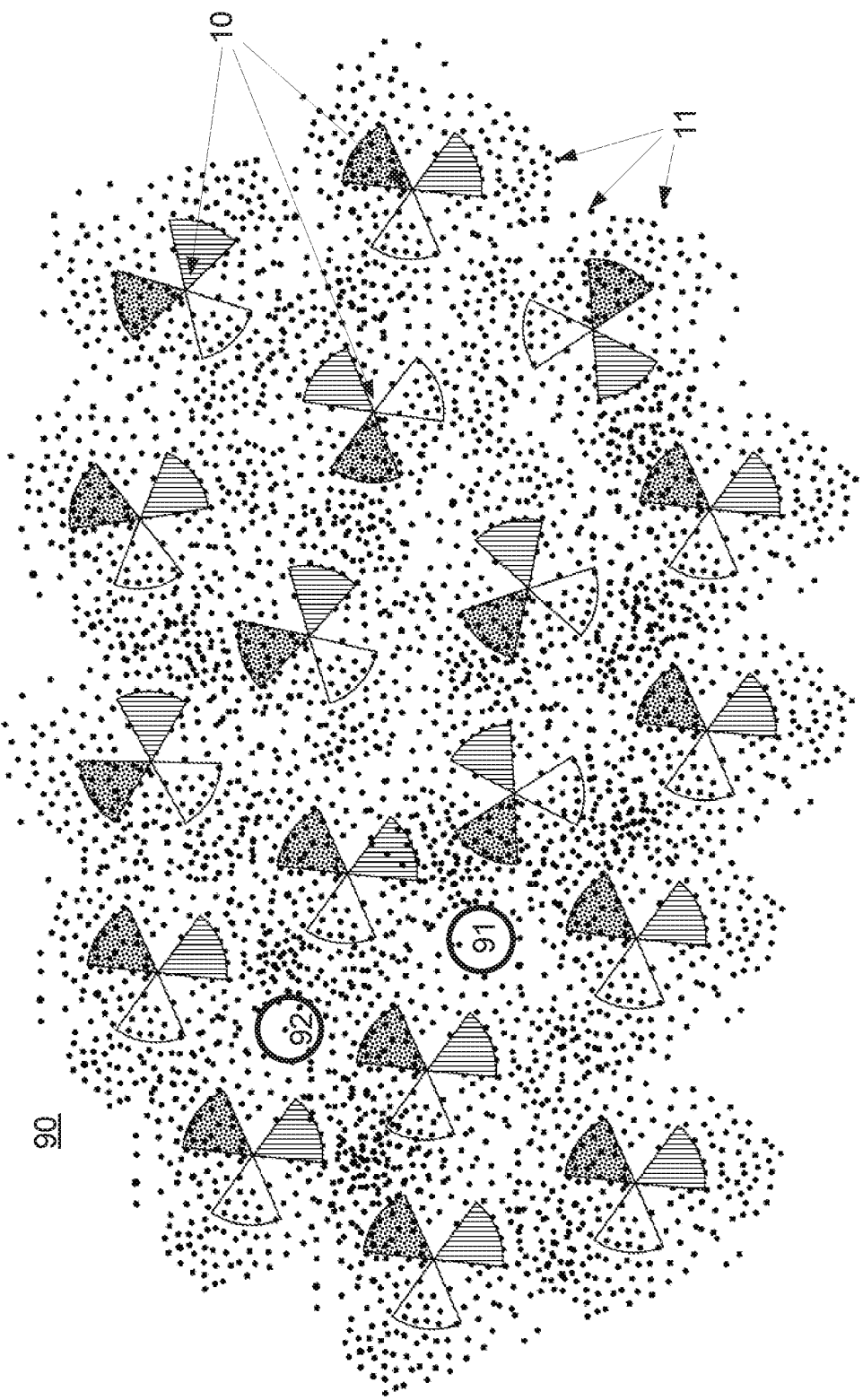

METHOD IN A RADIO COMMUNICATION NETWORK

TECHNICAL FIELD

The present disclosure relates to the field of improving performance in a wireless communication network. More particularly the invention pertains to handling measurement data from wireless devices located in the wireless communication network using geospatial clustering techniques in combination with Artificial Intelligence, AI and/or machine learning.

BACKGROUND

Operators of wireless communication networks establish a cell coverage plan with a calculated performance when setting up a wireless network. The coverage plan is needed to determine where access points, such as base stations, should be established to provide the calculated performance. When a wireless communication network is operational, it is necessary to verify and monitor the actual performance to identify any deviations from the calculated performance and to obtain the knowledge if, and how, the wireless communication network should be altered to provide an acceptable performance for the user.

The need to monitor performance in a wireless network has been recognized and different solutions to improve cell coverage have been suggested.

US 2017/150365, by T-mobile, discloses a method for optimizing network performance by identifying candidate sites for new base stations in a wireless radio communication network based on a clustering technique of traffic data in a cell planning tool.

CN 101345973, by China Mobile Group, discloses a method for optimizing the performance in a wireless radio communication network, wherein neighbouring cells are taking into considerations when optimizing the performance in a cell.

The need exists in both radio communication networks, such as 3G, LTE, etc., as well as wireless networks, such as WiFi networks.

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices or terminals also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

WiFi networks do not have the same hierarchian structure as 3GPP networks, and have access points that generate coverage. The access point is connected to the intranet/internet. In WiFi networks, the radio coverage is provided by access points, where one access point forms one (or several) cells covering an area of interest. Advanced access points can generate many cells with different identities covering same area. Several access points covering different areas forms a network providing seamless coverage in typical enterprise installations.

Although different solutions to improve cell coverage has been suggested, an overall understanding of the network performance and knowledge of how to improve cell coverage is still lacking.

SUMMARY

An object of the present disclosure is to provide a method, and system, which seeks to mitigate, alleviate, or eliminate one or more of the above-identified deficiencies in the art and disadvantages singly or in any combination.

This object is obtained by a method for monitoring network performance in a wireless communication network comprising multiple cells that communicate with wireless devices, each cell providing coverage in a geographical area and the wireless communication network having a cell coverage plan with a calculated performance. The method comprising retrieving geospatially located measurements from wireless devices; connecting each geospatially located measurement to a cell; arranging measurements into at least one cluster per cell; identifying deviations from the cell coverage plan; and initiating actions to reduce deviations.

An advantage with the present invention is that traffic is kept in optimal cell to maximize end user quality of experience (latency, throughput, video/voice quality).

Another advantage is that the invention provides for effective usage of expensive and limited frequency spectrum.

Another advantage is that investments in network operations are reduced since optimization of existing infrastructure is generally much cheaper than investments in new equipment.

Further aspects and advantages may be found in the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 7b is an example illustrating movement as a function of time of the sub-cluster centre in FIG. 7a.

FIG. 9 is an example illustrating radio network cells and unprocessed measurements from wireless devices.

DETAILED DESCRIPTION

Figure 1:
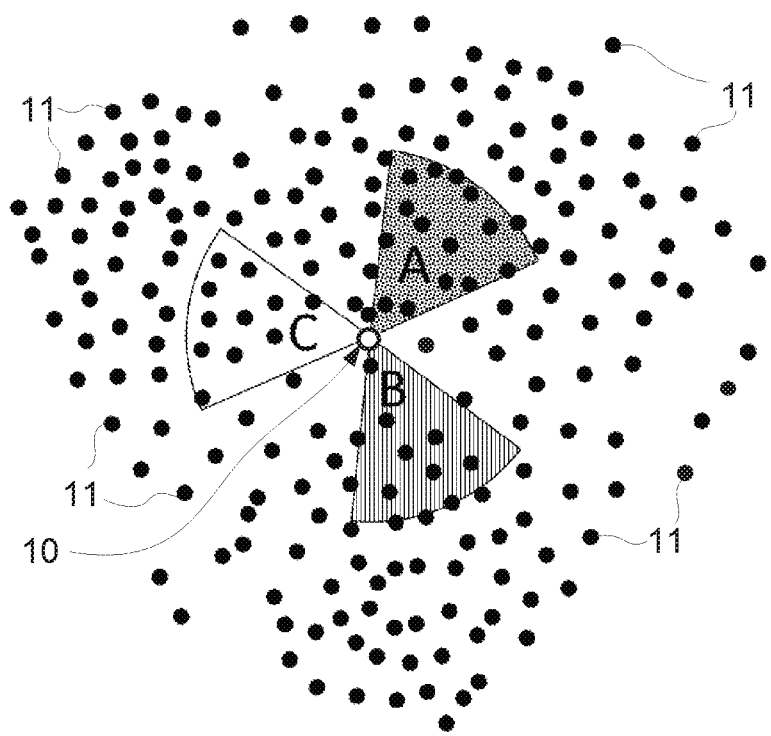
FIG. 1 is an example illustrating unprocessed measurements from wireless devices in a wireless communication network.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a method for monitoring network performance in a wireless communication system. As part of the development of the example embodiments presented herein, a problem will first be identified and discussed.

In the description, the term AI (for artificial intelligence), and machine learning is used alternately. Specifically, artificial specific intelligence is referred, and machine learning being the best existing technology for implementation of such.

In general, any data-source can be used, but typical information sources consist of the following two.

Crowdsource—from applications in end user phones

System solutions such as OSS (Operations Support System) based MDT (Minimization of Drive-Tests). MDT overview: 3GPP TS 37.320.

Though not optimal, traditional drive-test equipment's can also feed the described system with data.

In the description, it assumed that the collected measurement data used in the described system have symmetric probability distribution, meaning that e.g. in the geospatial domain, the samples represents the whole system, and each data sample should have equal probability to appear anywhere in appropriate domain.

However, if the used data source does not apply to this criterion, techniques to resample the data or using weighting functions could be applied. One example of the latter is data from dedicated measurement campaigns with guided collection having specific applications used by personnel or specific measurement teams. While measurement data from crowdsource and MDT systems represents the former, resulting in a better representation of true network geographical distribution.

Geospatially located measurements are typically collected from devices having a GNSS (Global Navigation Satellite System) receiver. Example of well-known GNSS systems are GPS, GLONASS, Galileo or BeiDou. But other non GNSS techniques such as, but not limited to, finger printing, TDOA (time difference of arrival) could form the basis for positioning. The measurements contain (among other parameters) an identifier to the connected serving cell. It can also include signal quality measurements (level, and signal to noise ratio), application measurements (e.g. throughput and latency) and many other measurements values.

A description of a radio network topology with geospatial information is normally stored in a database or file with details about the radio network, where each node (cell) in the radio network has information about itself and connections to other nodes (e.g. neighbour cells and/or base-station and/or other nodes) in the network. Examples of cell information is geographical position (latitude, longitude, altitude), antenna details (azimuth, installed tilt, beam width, etc.), cell specific settings (e.g. frequency, output power) and identifiers (such as logical and physical cell identifiers, neighbour cell relations and others).

The concept of the invention is to use a database with measurement samples and the description of the radio network, and to perform a number of steps to monitor network performance and identify differences between the measurements and a cell coverage plan for the wireless communication network having a calculated performance. The basic idea is to:

1) Connect each measurement to a cell (which may include removing measurements not possible to connect per cell)

2) Remove outliers per cell (optional step)

3) Cluster measurements per cell, could be one or more clusters depending on use case 4) Cluster measurements per geographical area 5) Apply different algorithms on the identified clusters, the type of algorithm depends on use case.

When connection different types of data sources, the identifiers mentioned above are typically not possible for a direct matching. Thus, a translation to a common base is needed, which is prior art and well known for a skilled person in the art. An example of such translation is to take identities from the cell description [base-station identity]*x+ [cell identity] and match that to the identity from the measurements.

In the following example illustrations, Euclidian is used in X/Y/Z domain as distance function for the clustering techniques, but the distance function may be adapted to others and also be applied to latitude/longitude/altitude after conversion whenever appropriate. AI/machine learning technique used is k-means or DBSCAN, but is not limited to those.

Using crowdsource data as the basis for measurements, it has been proven that one sample in such a huge dataset with unreliable non-calibrated source of information has very limited value. Before feeding the measurements into the step where clusters are identified, outliers may be detected and removed from the dataset. As a typical number, around 10% of the measurements should be removed. A typical AI/machine learning technique used to remove outliers is isolation forest, but one-class SVM (Support Vector Machine) or DBSCAN (Density-Based Spatial Clustering of Application with Noise) may be used.

The clustering is either performed per cell or per geographical area, or both. Geographical areas consist of a limited part of the network, could be larger or smaller or of equal size of a specific cell coverage area.

In many applications, the traffic patterns need to be separated by a distance, techniques for separating such clusters exists, most important is a linear separation check, to make sure the clusters do not overlap geographically. Prior art machine learning techniques such as SVM fits perfectly here, but traditional methods exist also. In other use cases, the clusters can have a non-linear separation, and possible overlap, but separated using the labels from the clustering mechanism.

According to one example, which reflects a typical use-case, the following steps are performed:

Identify main traffic cluster where most of the traffic is located within a cell Identify sub-clusters (none, one or several) per cell When such clusters are identified, that information can be used in several use cases, exemplified below. Whenever appropriate, use-cases can use pre-trained supervised learning models to further enhance confidence.

Swapped feed cables—if the main cluster from two cells belonging to the same site is located is each-others azimuth direction, as illustrated in connection with FIG. 5.

Overshooting—sub cluster located at certain distance from main cluster, as illustrated in connection with FIG. 8*b*.

Cell layer optimization—main cluster from different cell layers may be compared to planned capacity and coverage, as illustrated in connection with FIG. 7*a*.

Areas with bad coverage—areas with a majority of measurement samples having signal strength close to the receiver sensitivity level, as illustrated in connection with FIG. 7*b*.

Areas with low traffic load—areas with very low cluster density, could be due to bad coverage, or lack of network coverage, as illustrated in connection with FIG. 9.

Areas with high traffic load (hotspots)—subject to investments in more network capacity Interference areas—subject to re-planning and re-configuration of cell coverage plan, as illustrated in connection with FIGS. 10*a* and 10*b*.

Also, the identified clusters can be combined to identify high priority areas. Also, a layer with demographical data can be used together with identified hotspots for prioritisation and investment planning.

Though the figure layout in this description is exemplified with a radio communication network having site with tree cells, the method described in this document is not limited to this setup. A typical wireless network may have thousands of sites, with different cell configuration per site. A site can have anything from one omni-directional cell, to one or several cell sectors, including multiple cell layers on different frequencies.

Figure 2:
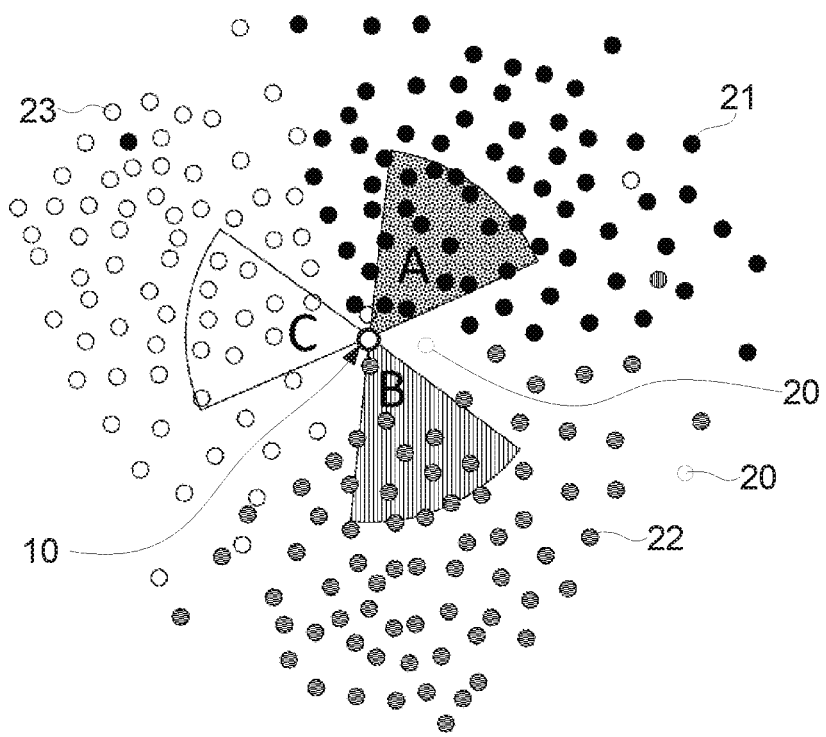
FIG. 2 is an example illustrating processed measurements from wireless devices grouped per cell in a wireless communication network.

FIG. 1 shows a site 10 having three cells marked A, B and C. Unprocessed measurements 11 are illustrated by dots around the site 10 before being connected to one of the cells. In may be possible to include measurements from several network operators. As explained above, information regarding the geospatial location for each measurement is retrieved and each measurement is thereafter connected to a cell. This is illustrated in FIG. 2, in which measurements 21 are connected to cell A, measurements 22 are connected to cell B, and measurements 23 are connected to cell C. This process is well known to a skilled person in the art. In case some measurements, as illustrated by dotted circles 20, cannot be connected to a cell, these measurements are removed.

Figure 3:
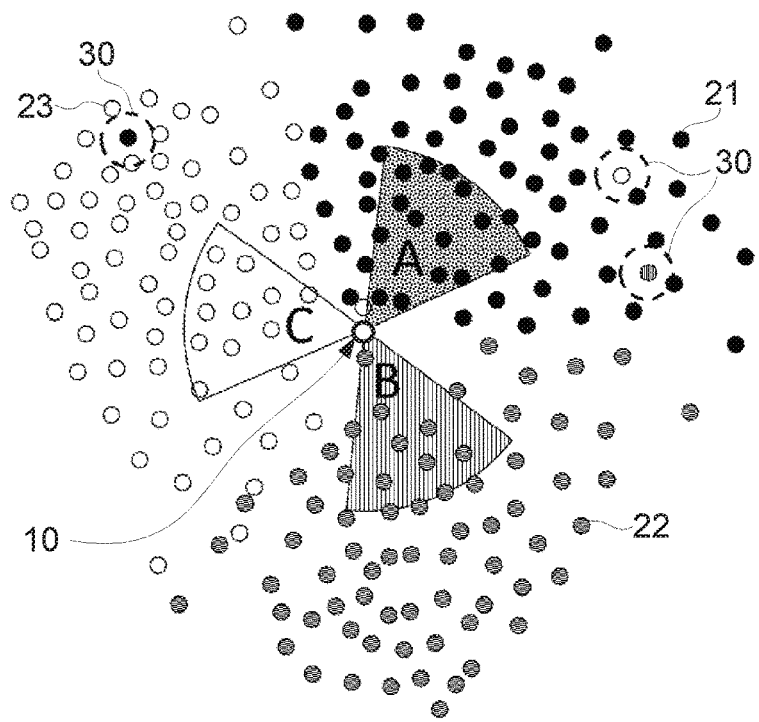
FIG. 3 is an example illustrating detection of outliers of processed measurements in FIG. 2.

FIG. 3 illustrates an optional step, in which outliers, illustrated by a dashed circle 30, are detected and removed. The removal may be performed using a machine learning technique, such as isolation forest, one-class SVM or DBSCAN.

Figure 4:
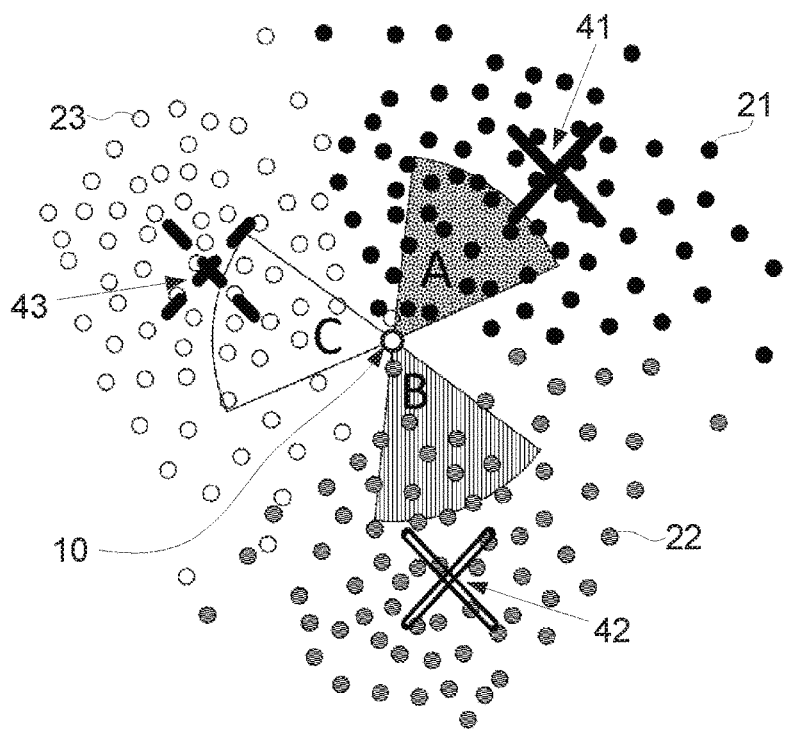
FIG. 4 is an example illustrating identifying a cluster centre for each cell, after removing outliers as exemplified in FIG. 3, based on Euclidian distance to the point with highest density.

FIG. 4 illustrates the process of identifying a cluster centre for each cell, by arranging the measurements into at least one cluster centre (e.g. based on Euclidian distance to the point with highest density). In this example, the cluster centre for cell A is denoted 41, the cluster centre for cell B is denoted 42 and the cluster centre for cell C is denoted 43.

A wireless network is created with the purpose of providing coverage to wireless device operating within the wireless network. A cell coverage plan is calculated to reflect the expected coverage in a geographical area supported by the infrastructure provided. In theory, the calculated coverage plan should be identical with the geospatially located measurements from the wireless devices interacting with the wireless network. This is however not the normal case due to unexpected issues.

In order to monitor the performance in the wireless network, deviations from the cell coverage plan for the wireless network are identified, and actions to reduce these deviations are initiated. These actions are described below and does not involve identifying suitable candidate sites for expanding the infrastructure in the wireless network. Instead, the actions involve adapting the current infrastructure in such a way that the deviations between the cell coverage plan and the users is reduced, or in some cases even updating the cell coverage plan for it to reflect actual performance. This could be the case when the physical environment has changed in such a way that the conditions for prior planning is not relevant (e.g. due to new houses blocking the access area for a specific cell). According to some embodiments, the step of identifying deviations further comprises determining actual performance in the wireless communication network and comparing the actual performance with the calculated performance.

Figure 5:
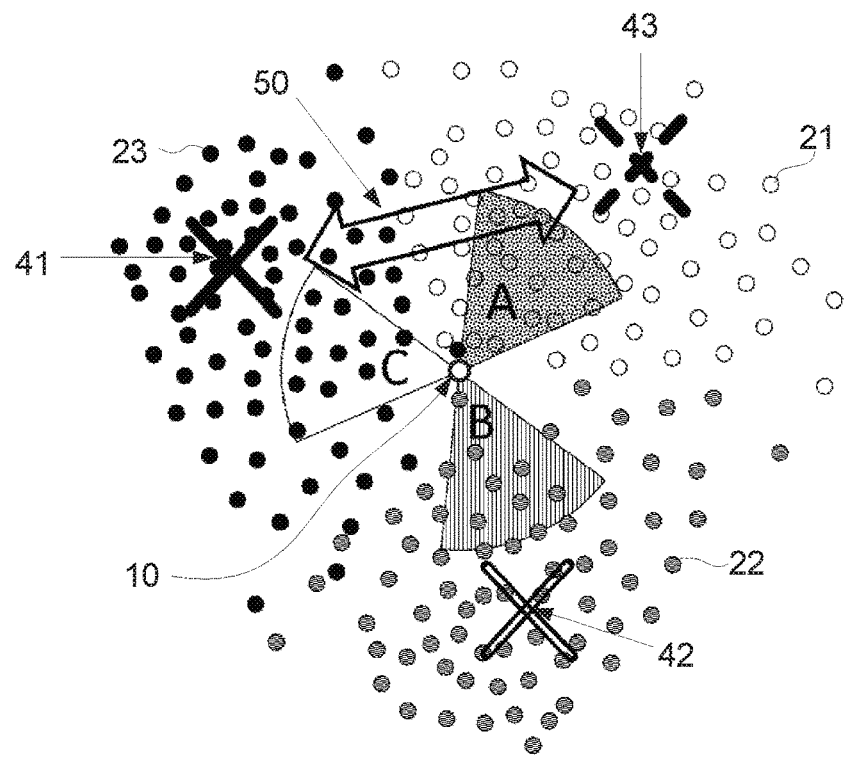
FIG. 5 is an example illustrating identification of swapped cells.

FIG. 5 is an example illustrating a situation when the coverage area of cells A and C are swapped. This is apparent when the cell cluster of cell C 43 is located in coverage area of cell A and the cell cluster of cell A 41 is located in coverage area of cell C, as indicated by the bi-directional arrow 50. A suitable action to eliminate, or at least reduce, the identified deviation is to swap the feed cables used to provide radio signals to the antenna covering the respective cell at the site 10.

Figure 6:
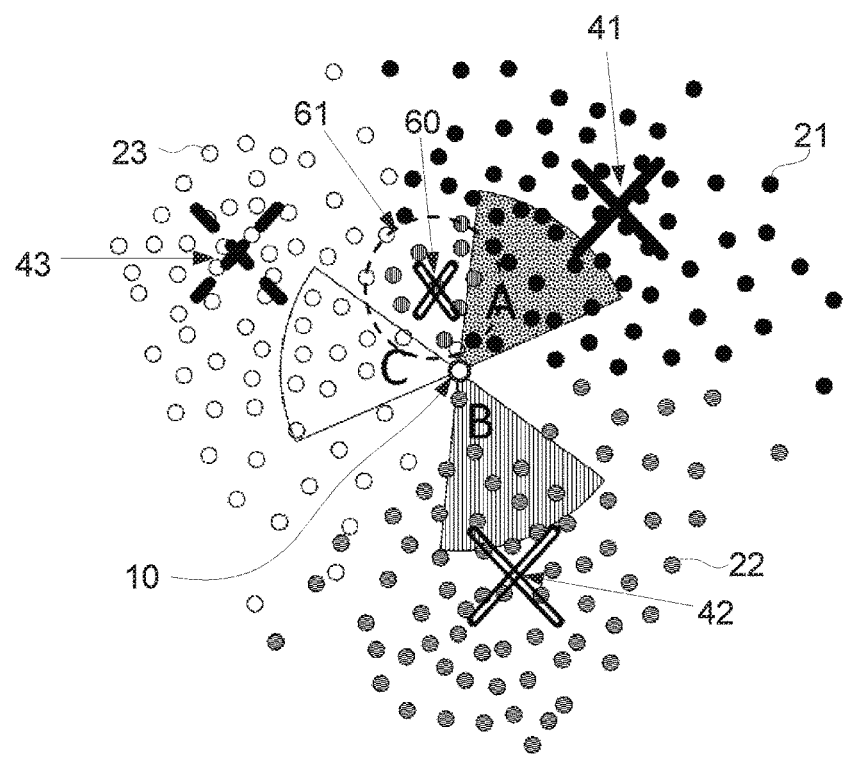
FIG. 6 is an example illustrating identification of a main lobe cluster centre and a back lobe cluster centre for a cell in a wireless communication network.
Figure 8A:
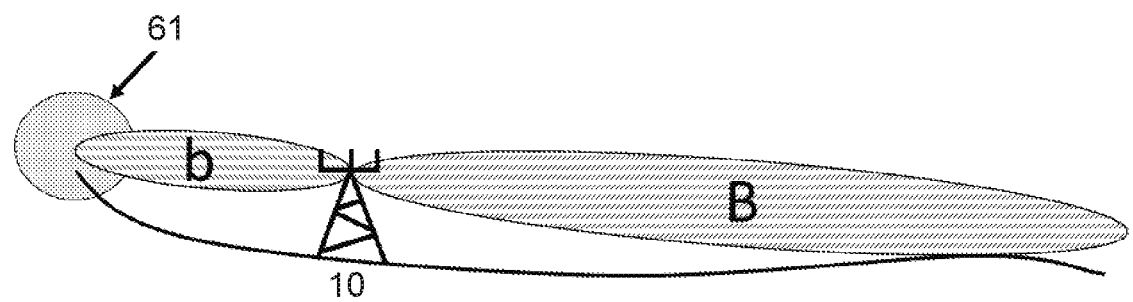
FIG. 8a is an example illustrating back lobe coverage as illustrated in FIG. 6.

FIG. 6 is an example illustrating identification of a main lobe cluster centre 42 and a back lobe cluster centre 60 for cell B in a wireless communication network providing coverage in an area 61. This indicates traffic in antenna back lobe. In some examples, this is a desired behaviour, as illustrated in connection with FIG. 8*a*, and in some embodiments, this is not a desired feature and appropriate actions have to be taken to reduce or eliminate traffic in the back lobe.

A suitable action to reduce traffic in the back lobe is to redirect the antenna in elevation, i.e. tilt the antenna, which may be done electrically and/or mechanically. A change in tile angle will affect the main lobe coverage area and in order to prevent interference with neighbouring cells it might be necessary to adjust the antenna power for cell B.

As mentioned above, FIG. 8a is an example illustrating back lobe coverage as illustrated in FIG. 6. In this example, the back lobe is indicated by a "b", and provide coverage in area 61. Is could advantageous when providing coverage in a specific area, e.g. on a mountain side, which may be difficult to access from other sites. This will reduce the number of sites needed in a wireless communication network and thereby reduce cost for building the infrastructure needed.

Figure 7A:
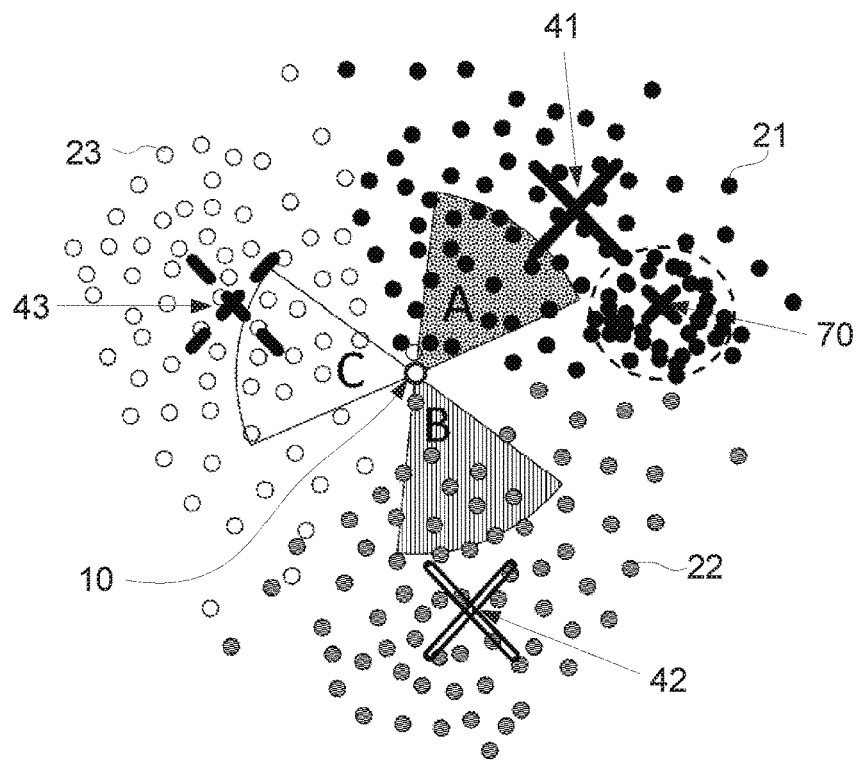
FIG. 7a is an example illustrating identification of a sub-cluster centre in the main lobe of a cell in a wireless communication system.

FIG. 7a is an example illustrating identification of a sub-cluster centre 70 in the main lobe of cell A in a wireless communication system. The sub-cluster 70 may be a high density cluster that is created during a specific time interval, e.g. due to a sporting event, when many users populate a limited area. This is not an indication that a change in infrastructure is needed, and an appropriate action to provide better coverage for the users during the specific time interval is to adjust the beam for cell A temporarily, e.g. by increasing the beam width for cell A and/or change the direction of the beam and/or change transmission power. Another action could be to change the beam direction of cell B to provide service to some of the wireless devices close to sub-cluster 70. Beam width and beam direction may be changed electrically by a controller.

Figure 7B:
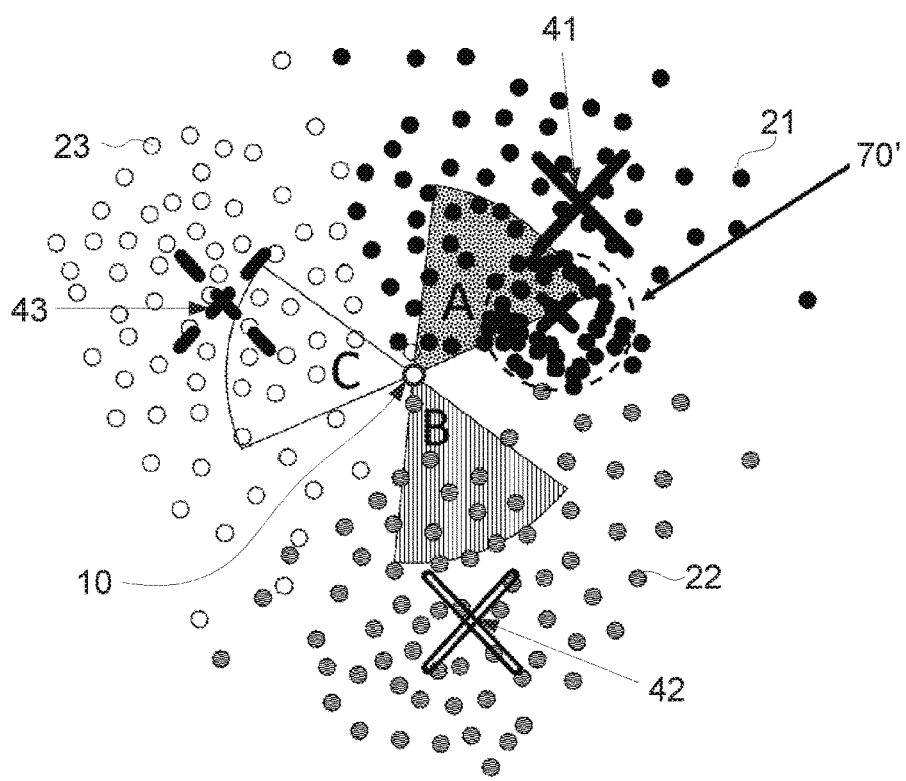

FIG. 7b is an example illustrating movement as a function of time of the sub-cluster centre 70 in FIG. 7a to a new position 70'. In both FIGS. 7a and 7b, a majority of cell load in high density sub-cluster 70 and 70' in cell A is close to the cell boarder to cell B. The illustrated movement of the sub-cluster centre 70 in FIG. 7a and to the new position 70' in FIG. 7b may be a re-occurring function over time (e.g. morning traffic vs. afternoon traffic). If a pattern is identified, a suitable action may be changing the azimuth of all cells on site to catch the high density cluster only in cell A and not close to cell B (to e.g. reduce signaling, intercell-interference and transmission gaps during cell changes between cell A and cell B). Other means could be changing antenna beam width (by e.g. switching antenna type).

Figure 8B:
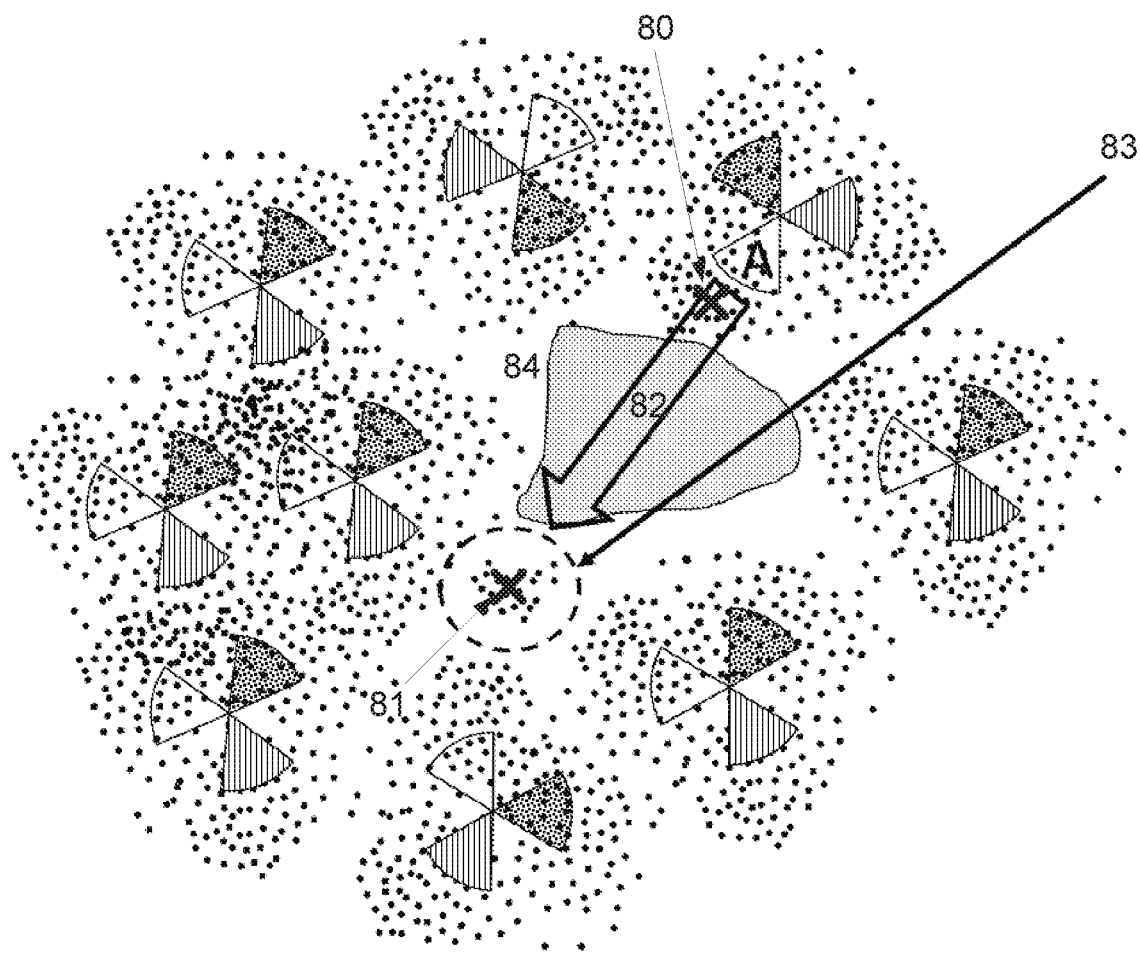
FIG. 8b is an example illustrating identification of two cluster centres in the main lobe of a cell due to overshooting.

FIG. 8b is an example illustrating identification of two cluster centres, a first cluster centre 80 and a second cluster centre 81, in the main lobe of cell A due to overshooting, as illustrated by arrow 82. The overshooting 82 provide coverage in an area 83 in which the second cluster centre 81 is positioned. Overshooting may occur when a large surface, such as a lake 84, is positioned in the direction of the main lobe of cell A. This may be useful during establishing the cell coverage plan, and must be taken into account when comparing the calculated performance according to the cell coverage plan with the actual performance from measurements.

Changed conditions, such as new buildings, etc., may seriously affect overshooting and needs to be considered. Suitable actions may include changing the coverage area of cells close to the second cluster centre 81 to reduce deviations between calculated performance and actual performance. In addition, it might also be necessary to update the cell coverage plan due to a changed physical environment.

FIG. 9 is an example illustrating a radio communication network 90 provided with a large number of sites 10, each having three radio network cells and unprocessed measurements from wireless devices 11. In this rather complex situation, patterns may be identified, that will identify areas, denoted 91 and 92, having few or no measurements from wireless devices. This may be an indication that the current communication network does not provide appropriate coverage and suitable actions to increase coverage may be needed.

It is also possible to detect devices with no coverage, and use a clustering technique to identify geographical areas where a mobile network operator lacks coverage in which their customer mobiles either lacks coverage completely or is roaming on a competitors network.

Measurements are either not connected to any cell at all and reported as OUT OF SERVICE (or equivalent) when no network at all is found, or reported as being in state EMERGENCY CALLS ONLY (or equivalent when roaming on a competitor network without roaming agreements).

Furthermore, it is a possibility to include measurement from devices connected to the network of the mobile network operator if the signal strength is reported as very low. This is to increase the validity of the area classified a no coverage. Such low signal strength typically resides on the border between coverage and no coverage areas. The reason for including them is to differ between areas where the device moves out of coverage with slowly decaying coverage (typical rural areas), from areas where coverage is cut off and lost within a very limited area, e.g. urban areas when entering underground subways.

If a cluster is found fulfilling the above criteria, the centre of the cluster, and all the measurement points belonging to that cluster, is virtually connected to the closest cell. The reason for this is to be able to effectively identify the cluster, over time as well as geographically, for tracking results of adjustments and tuning over time and improved fault management in general.

Figure 13:
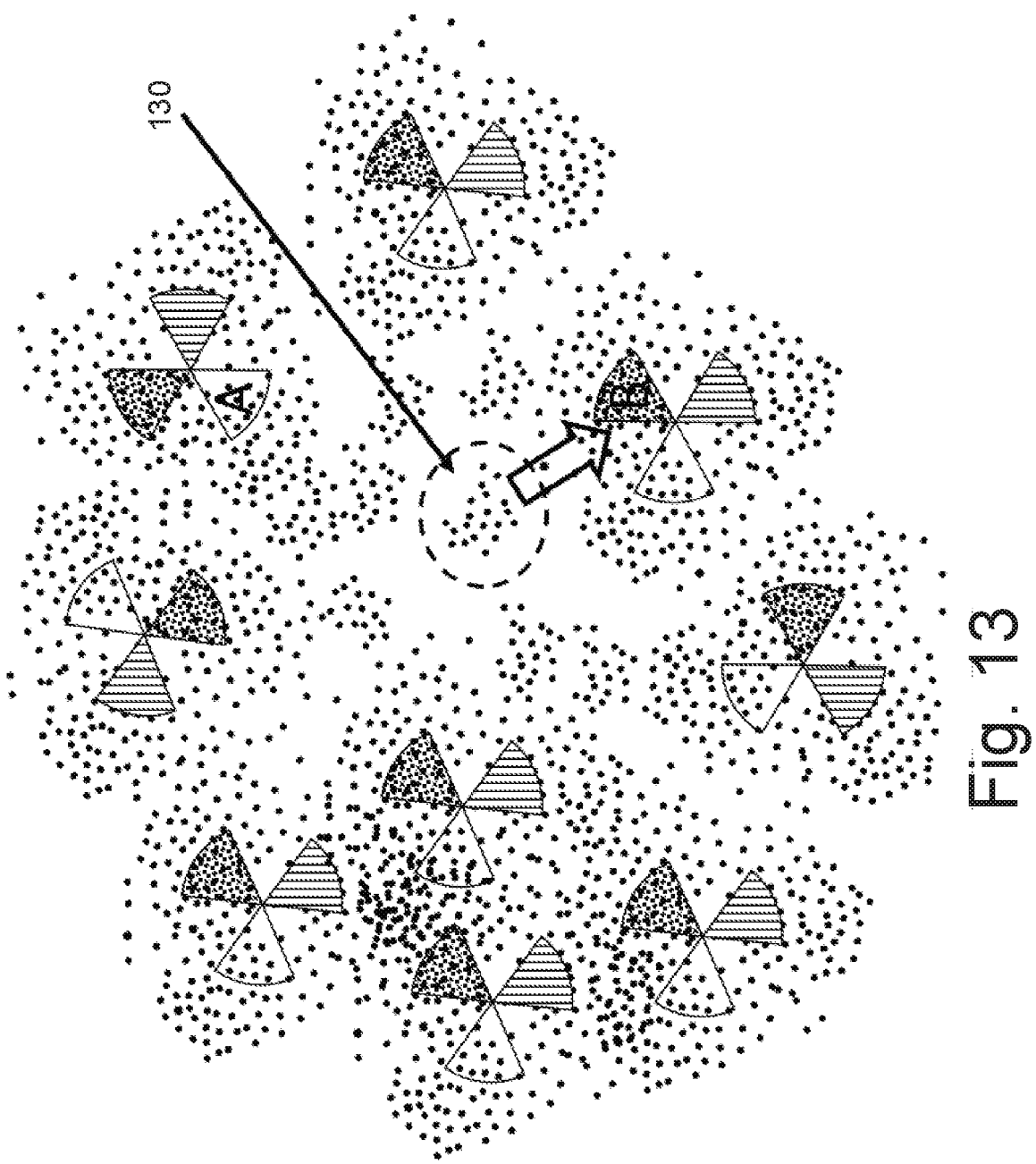
FIG. 13 is an example illustrating radio network cells with an identified area with no coverage for wireless devices.

In FIG. 13, a cluster of no coverage measurement points is found indicated by the dashed circle 130. In this example, the cluster is found with measurement points reported as "OUT OF SERVICE", "EMERGENCY CALL ONLY" and measurement points with low signal strength. The threshold for defining a low signal strength is set according to mobile receiver noise floor+interference level+margin. Especially the interference level varies (overtime and network), and is typically set for low signal strength at −112 dBm (4G); −108 dBm (3G); and −105 dBm (2G).

The closest cell is cell B and the cluster and corresponding measurement points are virtually connected to cell B for reasons mentioned above. Assuming Cell A was planned to cover the area where the no coverage cluster 130 is found, it will become interesting to compare with historical data and study if there has ever been any coverage, or if the coverage varies overtime. In some situations, there might be hardware faults related to the antenna installation in cell A, e.g. feeder corrosion or broken mounting causing a constant lack of coverage where there used to be good radio signal. Another common problem in radio access networks is time varying issues where the interference levels, which are network traffic load dependent, results in fluctuating cell boarders, and in such situations the historical data can be of great value to identify this problem.

Errors in the hardware of the network may also be identified by combining clusters formed by feed cables setup on site that might depend on frequency channels, technologies and antenna types. In order to ease troubleshooting of swapped feed cables on a site, and also to prioritize between indications of swapped feed cables issues from many sites, it is possible to check crossed feed cables over multiple technologies (e.g. 3G or 4G) and/or frequency channels (e.g. frequency layers or bands) installed on same site. If only one technology/frequency channel is swapped, it is an indication that the feeder crossing fault is done before the antenna combiner, while if multiple technologies/frequency channels are swapped, the faulty installation might be after the combiner. Also, it might indicate a more severe problem and thus higher priority if several technologies or frequency channels are swapped.

The term frequency channel (e.g. frequency layer or frequency band) refers to a channel where communication is performed, e.g. in 4G the term is EARFCN. Typically, a mobile network consists of more than one frequency channel on one or more frequency bands depending on the bandwidth and frequencies of the licensed spectrum available to the network deployment.

Figure 14A:
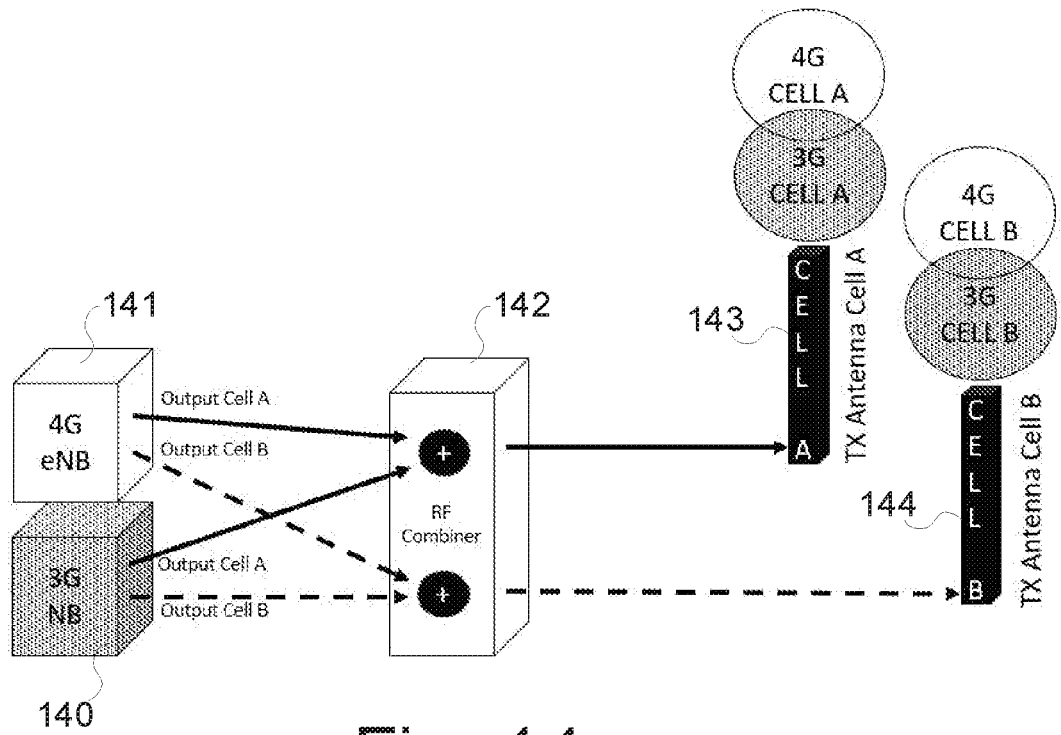
FIGS. 14a-14c illustrate examples in a simplified case with no MIMO and only downlink to identify swapped feed cables when different technologies are used.

FIG. 14a illustrates a simplified case with no MIMO (multiple input multiple output) and only TX (downlink) for a 3G and a 4G network covering the same area according to plan. The 3G node NB 140 outputs signals to be transmitted in cell A (solid line) and signals to be transmitted in cell B (dashed line). The 4G node eNB 141 outputs signals to be transmitted in cell A (solid line) and signals to be transmitted in cell B (dashed line). The signals for cell A and cell B are separately combined in an RF combiner 142, and transmitted via TX antennas 143 and 144, respectively, to the respective cell A and cell B.

Figure 14B:
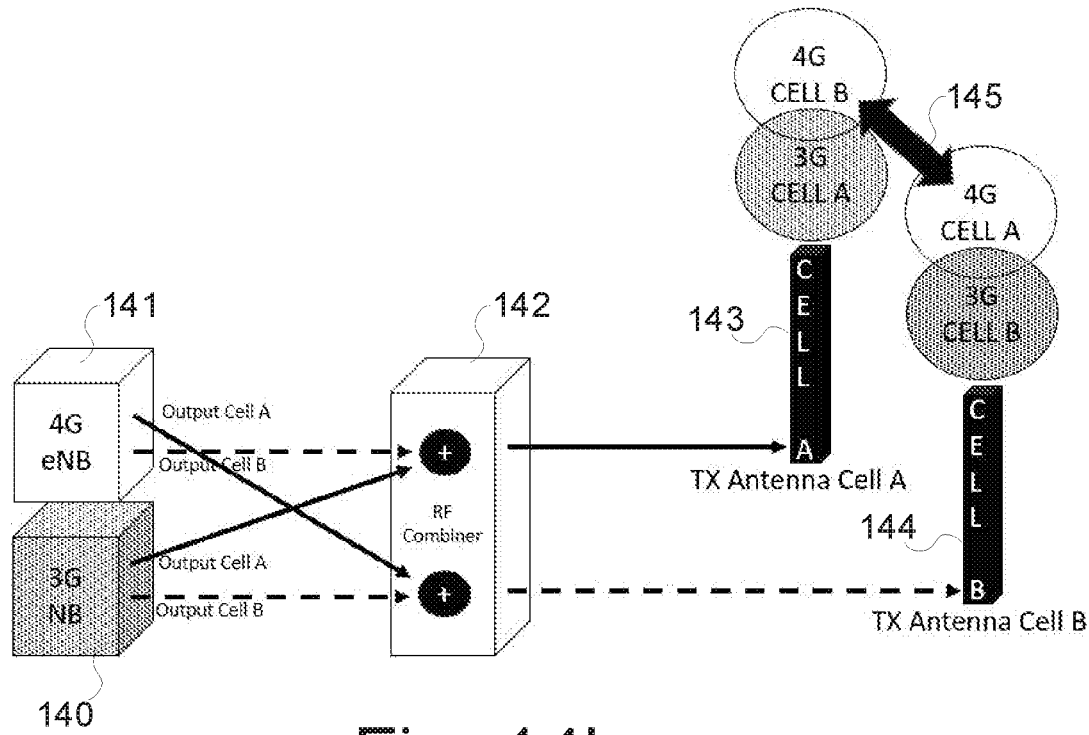

FIG. 14b illustrates the simplified case as in FIG. 14a (i.e. no MIMO and only TX (downlink) for a 3G and a 4G network intended to cover the same area according to plan) with the exception that due to a pre-combiner swap in the 4G network, i.e. feed cables from 4G Node eNB 141 are swapped before the combiner 142 resulting in 4G cell A covering planned area for cell B and vice versa, as indicated by arrow 145.

Figure 14C:
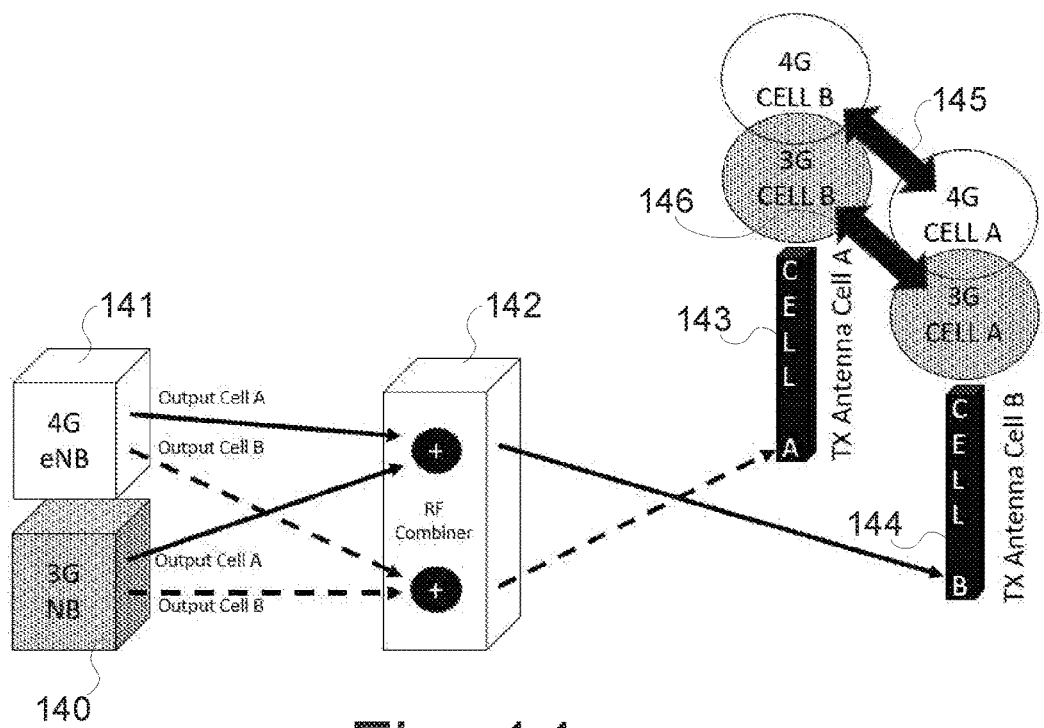

FIG. 14c illustrates the simplified case as in FIG. 14a (i.e. no MIMO and only TX (downlink) for a 3G and a 4G network intended to cover the same area according to plan) with the exception that due to a post-combiner swap of feed cables from the combiner 142 to the TX antennas 143 and 144, respectively, resulting in cell A covering planned area for cell B and vice versa for both 3G and 4G, as indicated by arrow 145 and 146, respectively.

Figure 15:
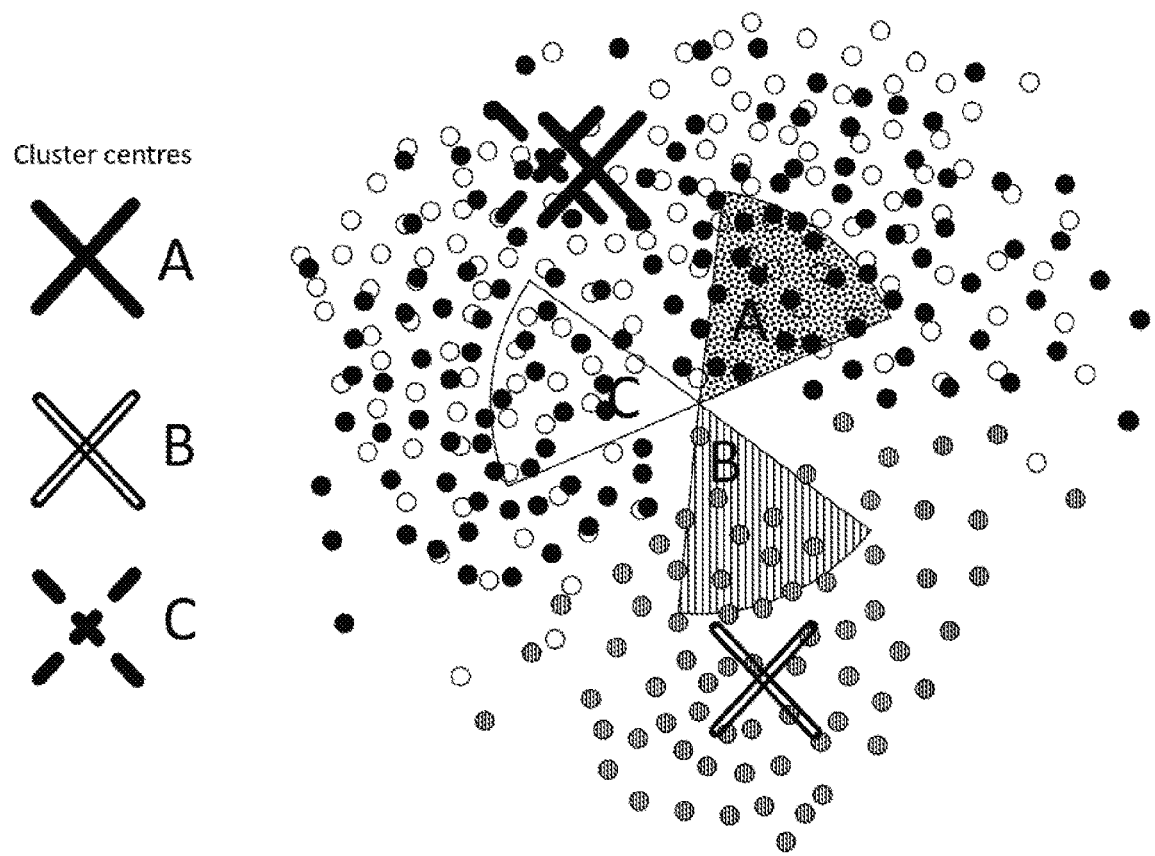
FIG. 15 is an example illustrating identification of a swapped feed cables in MIMO technologies using geospatial location of cluster centres and overlapping coverage.

FIG. 15 illustrates the situation when feed cables are swapped in MIMO case. Multi-antenna technologies, MIMO, uses more than one antenna to handle traffic in a cell. This is a well-known technique used for many years in WiFi as well as mobile networks, and was a standard in 4G from day 1.

If a site installation with three cells using two antennas per cell has the feed cables swapped for one antenna in cell A with one antenna in cell C, the resulting coverage pattern will be the same for the two cells (with a slight decrease (3 dB) in distance range). If many samples are used from both cells, the cluster centre of the two cells, i.e. cell A and cell C, respectively will be very close in geospatial domain as illustrated in FIG. 15 and this is a strong indication of a swapped MIMO feeder issue. According to some embodiments, a strong indication whether the feed cables are correct installed, or swapped by mistake, is obtained by combining the geospatial location of the cluster centres from the two cells with actual coverage beam-width. A typical overlap of more than 80% in coverage beam-width and the two cluster centres within 30 degrees from each other may be taken as an indication of a faulty installation.

Figure 16A:
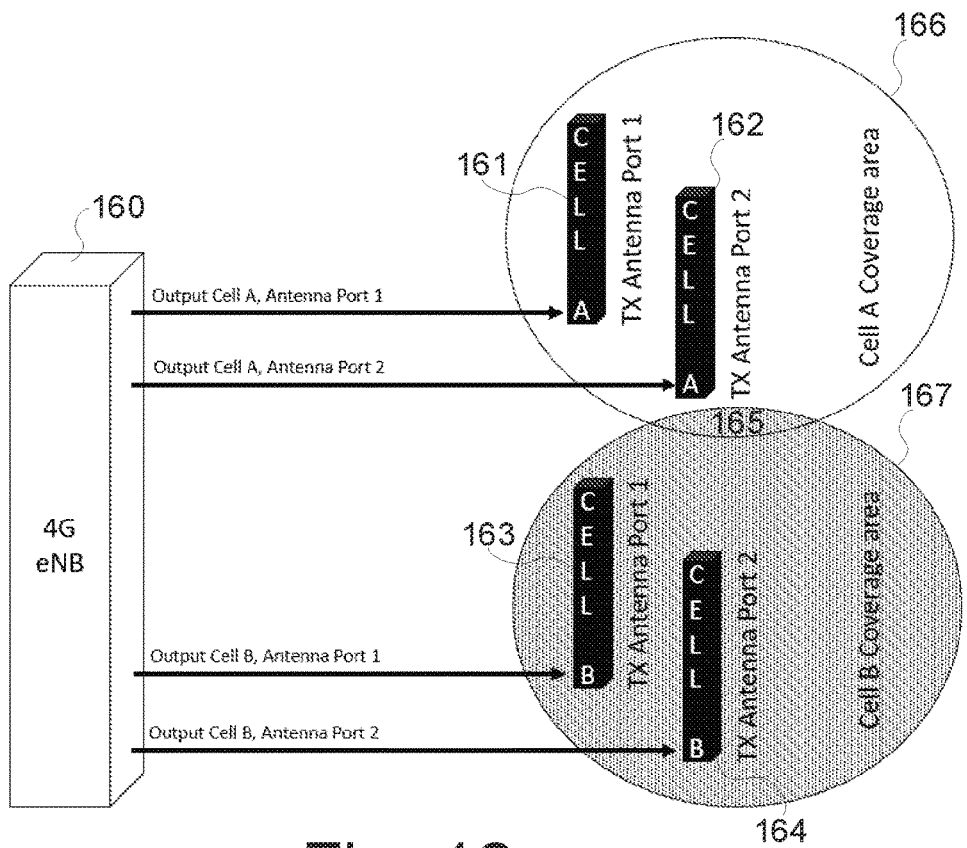
FIGS. 16a and 16b illustrate examples in a simplified case with MIMO and only downlink to identify swapped feed cables in a 4G system.

FIG. 16a illustrates a simplified case with normal MIMO and only TX (downlink) for a 4G network covering different areas, cell A and cell B respectively, according to plan. The 4G eNB 160 provides signals through feed cables to Port 1 and Port 2, respectively of the TX antenna for cell A and cell B, respectively. For cell A, TX Antenna Port 1 is denoted 161 and TX antenna Port 2 is denoted 162. For cell B, TX Antenna Port 1 is denoted 163 and TX antenna Port 2 is denoted 164. Only a small overlapping coverage 165 is obtained between coverage area for cell A (illustrated by a circle 166) and coverage area for cell B (illustrated by a circle 167).

Figure 16B:
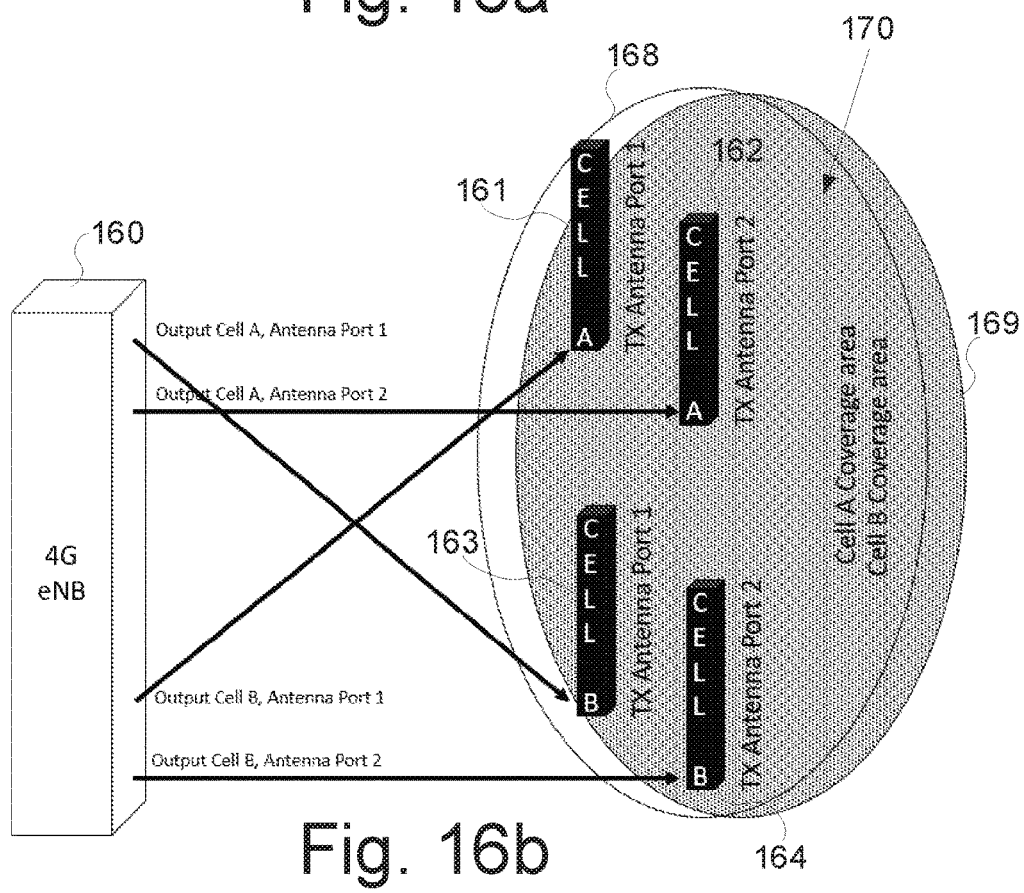

FIG. 16b illustrates the simplified case as in FIG. 16a (i.e. with normal MIMO and only TX) with the exception that due to a TX Antenna Port 1 MIMO swap, i.e. feed cables for TX Antenna Port 1 has been swapped between cell A and cell B resulting in large overlap between the coverage area for cell A 168 and the coverage area for cell B 169, as indicated by reference numeral 170.

The situation described in connection with FIGS. 16a and 16b relates to a 2×MIMO. The same concept may also be applied to higher order of MIMO configurations, such as 4×MIMO and 8×MIMO. The pattern for higher order MIMO is very similar and the exact same technique may be used to identify swapped feed cables. However, the thresholds for defining overlap differ slightly.

Figure 10A:
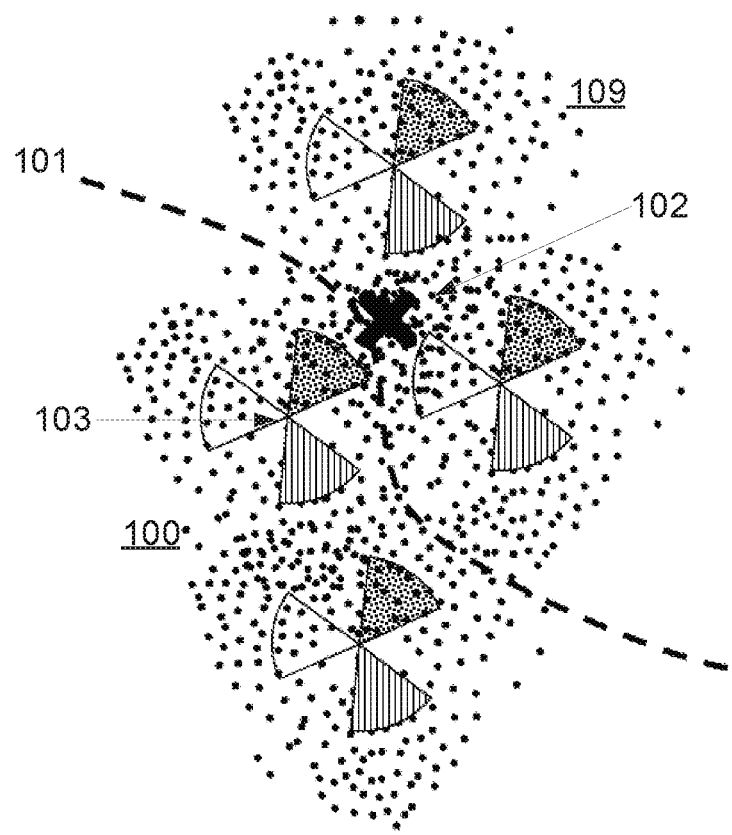
FIG. 10a is an example illustrating interference situations between networks close to a boarder.

FIG. 10a is an example illustrating interference situations between networks close to a boarder 101 and for illustration purposes a cluster centre 102 for a cell originating from a site 103 in a network 100. The boarder 101 could be any kind of boarder (not only cell boarder but also an area boarder separating countries (spectrum reuse issues may be relevant in those cases), boarder separating indoor and outdoor, and also cell cluster boarder (optimization happens often per cell cluster).

Figure 10B:
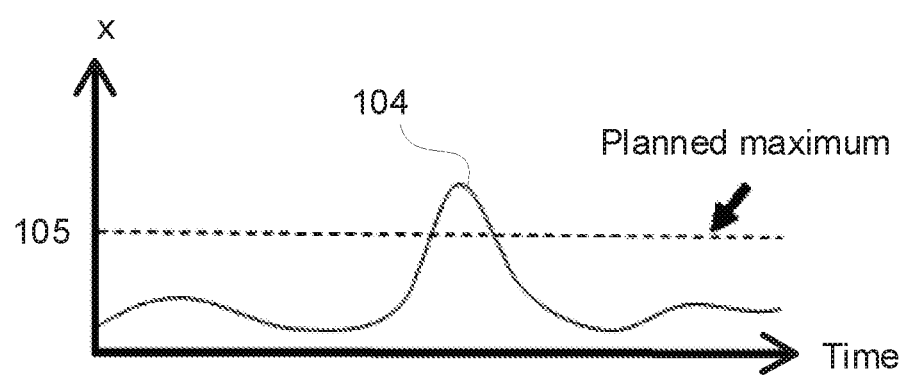
FIG. 10b is a graph illustrating tracking of cluster over time.

By tracking cluster centre variations over time, as illustrated in FIG. 10b, the distance "x" from the site to the boarder is monitored, curve 104, to identify when the distance is larger than a predetermined planned maximum distance 105. Tracking cluster centre variations over time may also be used to identify trends and areas with time-varying issues. An increase in distance is an indication of interference from a neighbouring network 109. A suitable action is to change communication parameters, such as operating frequencies, to avoid interference in the future. Another suitable action is to reduce/adjust coverage accordingly by changing antenna tilt, antenna type or transmit power parameters.

Figure 11:
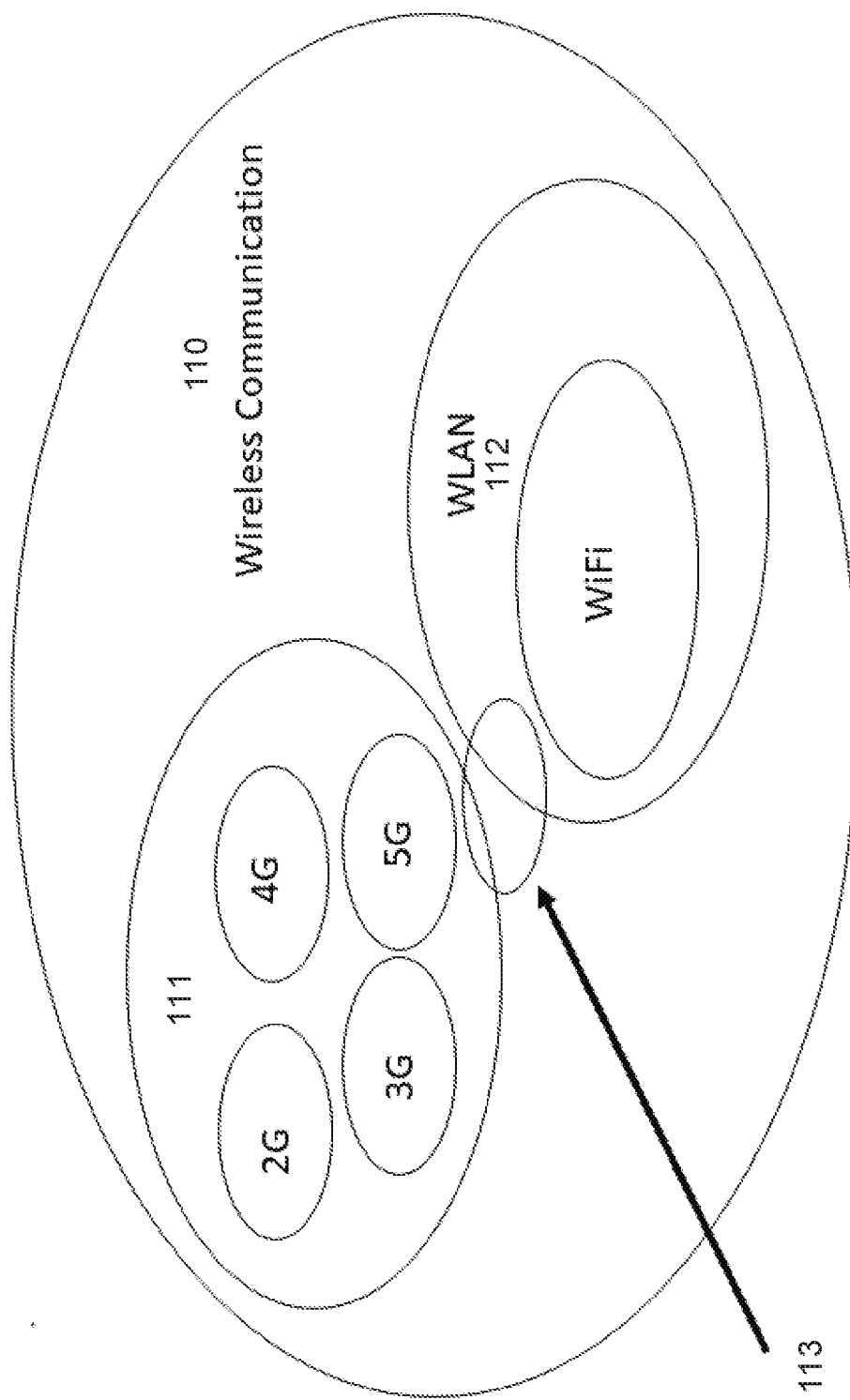
FIG. 11 illustrates a multi-standard wireless communication environment.

FIG. 11 illustrates a multi-standard wireless communication environment 110 comprising a radio communication network 111, including different generations of wireless standards, such as 2G, 3G, 4G and 5G, and a wireless local area network, WLAN, 112 including WiFi networks. Merged technologies 113 will provide a bridge between traditional radio technologies and wireless technologies. The present invention will be able to monitor the performance of both types of wireless communication networks and also be able to monitor the bridge there between with the goal to steer traffic by optimization towards the best choice from an end user perspective in terms of quality of experience (low delay, high throughput, good speech/video quality).

The present invention is a method for monitoring network performance in a wireless communication network comprising multiple cells that communicate with wireless devices. This includes radio communication networks, such as LTE, and wireless networks such as WiFi networks. Each cell provides coverage in a geographical area and the wireless communication network has a cell coverage plan with a calculated performance.

Figure 12:
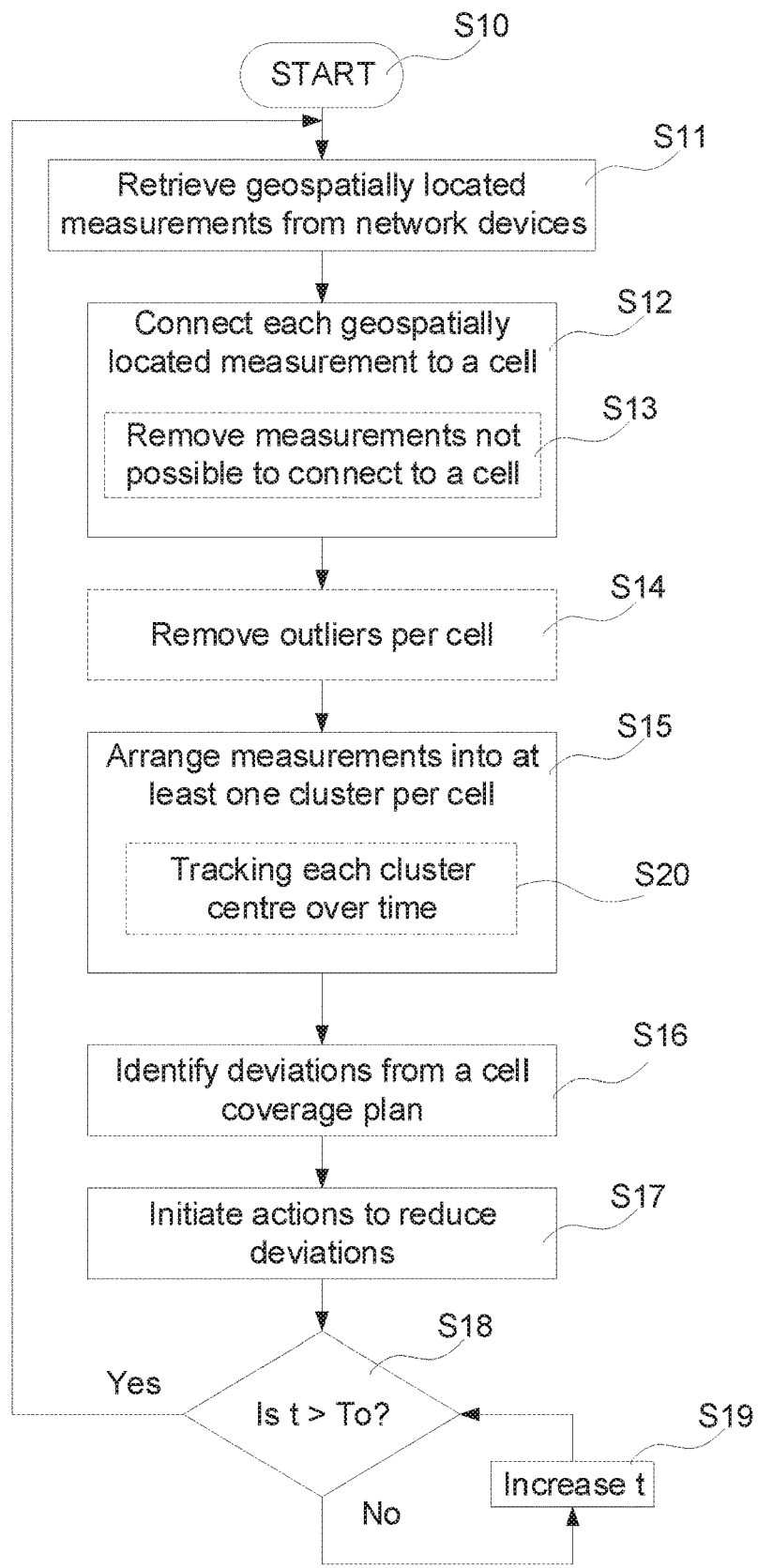
FIG. 12 is a flowchart illustrating embodiments of method steps.

FIG. 12 is a flowchart illustrating embodiments of method steps for the method. The flow starts in step S10 and in step S11 geospatially located measurements from wireless devices are retrieved, e.g. from a database containing relevant information as discussed above.

In step S12, each geospatially located measurement is connected to a cell. According to some embodiments, the step of connecting S12 each geospatially located measurement further comprises virtually connecting measurement points indicating no coverage to a cell. According to some embodiments, measurement points indicating no coverage are identified to belong to at least one of the categories: Out of service; emergency calls only; and low signal strength. According to some embodiment, the step of connecting S12 each geospatially located measurement further comprises removing S13 measurements not possible to connect to a cell.

In step S15, measurements are arranged into at least one cluster per cell. According to some embodiments, the step of arranging S15 measurements into at least one cluster per cell is based on a distance function. According to some embodiments, the distance function is determined using machine learning techniques applying latitude/longitude/altitude information. According to some embodiments, the step of arranging S15 measurements into at least one cluster further comprises clustering measurement points indicating no coverage and connecting them virtually to the closest cell.

In step S16, deviations from the cell coverage plan are identified. According to some embodiments, the step of identifying S16 deviations further comprises determining actual performance in the wireless communication network and comparing the actual performance with the calculated performance.

In step S17 actions are initiated to reduce deviations. According to some embodiments, actions comprises changing the antenna configuration for a cell, e.g. by altering the azimuth, elevation and/or beam width. According to some embodiments, actions comprises updating the cell coverage plan with or without changing the antenna configuration. According to some embodiment, actions comprises repairing hardware faults, e.g. caused by feeder corrosion, broken mounting, swapping feed cables on a site, etc.

According to some embodiment, the flow comprises removing S14 outliers per cell before arranging S15 measurements into the at least one cluster per cell. According to some embodiments, the step of removing S14 outliers is performed using a machine learning technique.

According to some embodiments, the method further comprises continuously updating S18 the measurements by repeating steps described above, including at least steps S11, S12, S15, S16 and S17. According to some embodiments, the steps are repeated at regular intervals S19 and/or on demand.

According to some embodiment, each cluster has a cluster centre and the step of arranging S15 measurements into at least one cluster per cell further comprises tracking S20 the position of each cluster centre over time.

The present invention also relates to a computer program for monitoring network performance in a wireless communication network, comprising instructions which, when executed on at least one processor, cause the at least one processor to carry out the method as described above.

The present invention also relates to a computer-readable storage medium carrying a computer program monitoring network performance in a wireless communication network.

The present invention also relates to a system for monitoring network performance in a wireless communication network comprising multiple cells that communicate with wireless devices, each cell providing coverage in a geographical area and the wireless communication network having a cell coverage plan with a calculated performance, wherein the system comprising a receiver configured to retrieve geospatially located measurements from wireless devices, a processing unit configured to perform the method as described above.

According to some embodiment, the system further comprising a memory configured to carry the computer program described above.

According to some embodiment, the system further comprises a presenting unit configured to indicate differences between identify deviations and the cell coverage plan.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Even though originally being a single cell centric technology, WiFi has become widely used in enterprises where it is being deployed in a similar way as traditional cellular 3GPP technologies.

In such installations, issues known to cellular networks will apply and must be addressed. Frequency spectrum reuse, inter-cell interference, coverage, roaming and cell boarder optimisation must all be considered and the techniques for addressing them according to the present invention them will apply.

Also note that terminology such as eNodeB and wireless device should be considered as non-limiting and does in particular not imply a certain hierarchical relation between the two. In general "eNodeB" could be considered as device 1 and "wireless device" as device 2, and these two devices communicate with each other over some radio channel. Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for monitoring network performance in a wireless communication network of sites comprising at least one site including multiple cells that communicate with wireless devices, each cell providing coverage in a geographical area and the wireless communication network having a cell coverage plan with a calculated performance, the method comprising:
   a) retrieving geospatially located measurements from wireless devices;
   b) connecting each geospatially located measurement to a cell;
   c) arranging measurements into at least one cluster per cell;
   d) identifying deviations from the cell coverage plan; and
   e) initiating actions to reduce deviations,
   wherein connecting each geospatially located measurement comprises virtually connecting measurement points indicating no coverage to the cell.

2. The method according to claim 1, wherein connecting each geospatially located measurement further comprises removing measurements not possible to connect to a cell.

3. The method according to claim 1, wherein the method further comprises identifying measurement points indicating no coverage belonging to at least one of the categories:
   Out of service;
   emergency calls only; and
   low signal strength.

4. The method according to claim 1, wherein the step of arranging measurements into at least one cluster further comprises clustering measurement points indicating no coverage and connecting them virtually to the closest cell.

5. The method according to claim 4, wherein the action comprises repairing hardware faults.

6. The method according to claim 1, further comprising removing outliers per cell before arranging measurements into the at least one cluster per cell.

7. The method according to claim 6, wherein the step of removing outliers is performed using a machine learning technique.

8. The method according to claim 1, wherein identifying deviations further comprises determining actual performance in the wireless communication network and comparing the actual performance with the calculated performance.

9. The method according to claim 1, wherein the method further comprises continuously updating the measurements by repeating steps a)-e).

10. The method according to claim 9, wherein the steps a)-e) are repeated at regular intervals and/or on demand.

11. The method according to claim 1, wherein the step of arranging measurements into at least one cluster per cell is based on a distance function.

12. The method according to claim 11, wherein the distance function is determined using machine learning techniques applying latitude/longitude/altitude information.

13. The method according to claim 1, wherein each cluster having a cluster centre and the step of arranging measurements into at least one cluster per cell further comprises tracking the position of each cluster centre over time.

14. A non-transitory computer program product for monitoring network performance in a wireless communication network, wherein the non-transitory computer program product comprises instructions which, when executed on at least one processor, cause the at least one processor to carry out the method according to claim 1.

15. A non-transitory computer-readable storage medium including a computer program to monitor network performance in a wireless communication network according to the method of claim 1.

16. A system for monitoring network performance in a wireless communication network comprising multiple cells that communicate with wireless devices, each cell providing coverage in a geographical area and the wireless communication network having a cell coverage plan with a calculated performance, wherein the system comprises a receiver configured to retrieve geospatially located measurements from wireless devices, a processing unit configured to perform the method according to claim 1.

17. The system according to claim 16, further comprising a memory configured to carry the computer program to perform the steps of
   a) retrieving geospatially located measurements from wireless devices;
   b) connecting each geospatially located measurement to a cell;
   c) arranging measurements into at least one cluster per cell;
   d) identifying deviations from the cell coverage plan; and
   e) initiating actions to reduce deviations.

18. The system according to claim 16, wherein the system further comprises a presenting unit configured to indicate differences between identify deviations and the cell coverage plan.

* * * * *